United States Patent [19]

Fukunaga Takao

[11] Patent Number: 4,611,699
[45] Date of Patent: Sep. 16, 1986

[54] CONTROL VALVE FOR A HYDRAULIC CLUTCH

[75] Inventor: Fukunaga Takao, Hirakata, Japan

[73] Assignee: Kabushiki Kaisha Daikin Seisakusho, Osaka, Japan

[21] Appl. No.: 639,396

[22] Filed: Aug. 10, 1984

[30] Foreign Application Priority Data

Aug. 10, 1983 [JP] Japan ............................ 58-124981[U]

[51] Int. Cl.⁴ ............................................ B60K 41/02
[52] U.S. Cl. .................................. 192/0.076; 192/85 R
[58] Field of Search ................. 192/0.07, 0.075, 0.076, 192/109 F, 3.57, 85 R

[56] References Cited

U.S. PATENT DOCUMENTS

| 2,809,536 | 10/1957 | O'Malley | 192/109 F |
| 3,466,950 | 9/1969 | Mummert | 192/109 F |
| 4,444,297 | 4/1984 | Parsons | 192/109 F |

Primary Examiner—George H. Krizmanich
Attorney, Agent, or Firm—Burns, Doane, Swecker & Mathis

[57] ABSTRACT

A control valve for a hydraulic clutch system comprising a cylindrical valve body; a first piston slidably fitted into the valve body; a second piston slidably fitted into the valve body; a rod connecting both pistons together; a control chamber formed between both pistons and around the rod; an inlet connecting the chamber to a supply passage connected to a hydraulic source; an outlet connecting the chamber to a supply passage connected to a hydraulic clutch; a leak port connecting the chamber to a drain passage; a first forcing mechanism operable to force the first piston toward the second piston by a force according to the rotation speed of an engine; and a second forcing mechanism operable to force the second piston toward the first piston by a force according to the opening degree of the throttle.

4 Claims, 2 Drawing Figures

CONTROL VALVE FOR A HYDRAULIC CLUTCH

BACKGROUND AND SUMMARY OF THE INVENTION

The present invention relates to a control valve for a hydraulic clutch employed in an automobile and other vehicle for an industrial use, an agricultural use and others.

Generally, a control valve system for a hydraulic clutch is designed to control a pressure to be supplied to the clutch according to a speed of a vehicle and an opening degree of a throttle (a stepped-on length of an accelerator pedal). However, a conventional hydraulic control valve system is provided at an oil passage for supplying oil to the clutch with a pair of valves. One of the valves is operable to control the pressure according to the speed of the vehicle. The other is operable to control the pressure according to the opening degree of the throttle. This system including two independent valves has many parts, and thus has a complicated structure. Further, it is difficult to obtain an intended control characteristic when engaging the clutch.

Accordingly, it is an object of the invention to provide an improved control valve having a simple structure and operable to obtain an intended hydraulic characteristic.

The essence of the invention is to provide two pistons in a valve body. One of the pistons is actuated by a force according to a rotation speed of an engine. The other is actuated by a force according to an opening degree of the throttle.

DETAILED DESCRIPTION OF THE PREFERRED EMBODIMENTS

Figure 1:
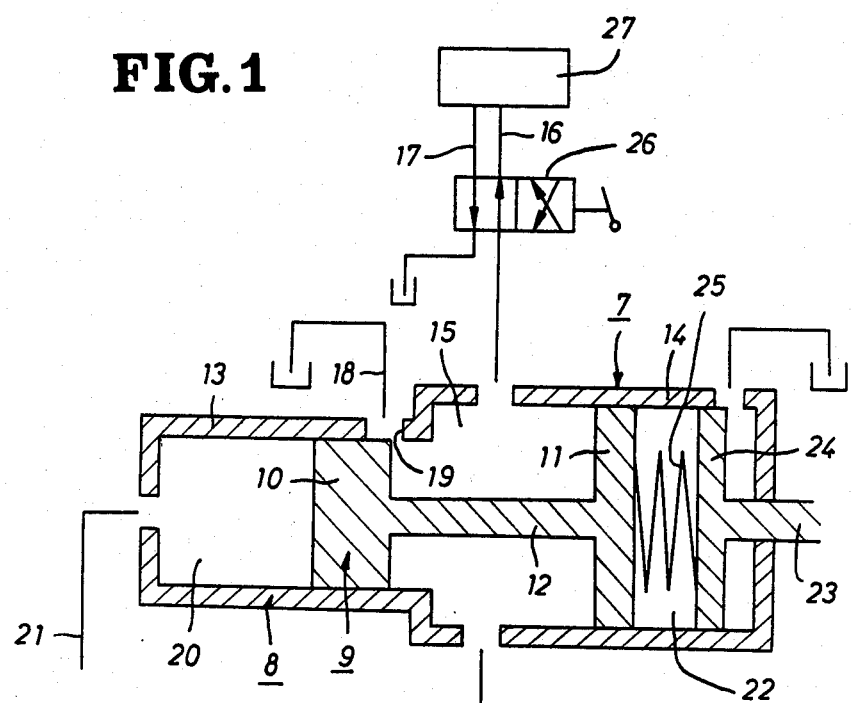
FIG. 1 is a schematic sectional view of a hydraulic clutch system of an automobile including a control valve according to the invention.

Referring to FIG. 1, an inlet passage of an oil pump 2 is connected through a strainer 1 to an oil tank. An outlet of the pump 2 is connected through a supply passage 3 to a control valve 7 according to the invention. The passage 3 is also connected through a branch passage 4 to a relief valve 5. The valve 7 comprises a cylindrical valve body 8 and a piston combination 9. The piston combination 9 is provided with a first piston 10 of a rather small diameter and a second piston 11 of a large diameter. The central portions of the pistons 10 and 11 are integrally connected together by a rod 12 of a small diameter. The piston 10 is slidably fitted into a portion 13 of a small diameter of the body 8. The piston 11 is slidably fitted into a portion 14 of a large diameter of the body 8. An annular chamber 15 (pressure control chamber) is formed between the rod 12 and the body 8. Said passage 3 is connected to the chamber 15. The chamber 15 is connected through an oil supply passage 16 to a cylinder in a hydraulic clutch 27. This cylinder is also connected to a drain passage 17. A selector valve 26 is provided in the passages 16 and 17. The chamber 15 is connected to a drain passage 18 through a leak port 19, which is provided at the portion 13 of the body 7 and is operable to be closed by the piston 10.

A chamber 20 facing the piston 10 is formed in the portion 13. The chamber 20 is connected through a passage 21 to a hydraulic chamber of a hydraulic governor (not shown), so that a pressure supplied into the chamber 20 increases according to an increasing of a speed of an automobile or an engine. A rod 23 is slidably fitted into a hole of the end wall of the body 8 opposite to the chamber 20. In the body 8, the rod 23 is provided at the end with a portion 24 of a large diameter. The portion 24 is slidably fitted into the portion 14 of the body 8. A chamber 22 is formed between the piston 11 and the portion 24. The piston 11 and the portion 24 are connected by a compressible coil spring 25 disposed in the chamber 22. The rod 23 is connected to an accelertor pedal (not shown) through a link mechanism or the like, and thus, is operable to move toward the piston 11 when an opening degree of the throttle increases.

The oil in the tank is pressurized by the pump 2 and is supplied into the passage 3. The pressure in the passage 3 is regulated by the relief valve 5. The oil is supplied from the passage 3 through chamber 15 and the passage 16 into the cylinder in the clutch 27. As detailed below, the valve 7 controls the pressure of the oil according to the speed of the vehicle and the opening degree of the throttle with discharging a part of the oil through the leak port 19.

At the starting of the vehicle, the pressure in the hydraulic governor is low, so that the oil in the chamber 20 weakly forces the piston 10 toward the piston 11. Further at the starting, the accelerator pedal is stepped on deeply to open the throttle, so that the portion 24 of the rod 23 moves toward the piston 11 and strongly forces the piston 11 through the spring 25 toward the piston 10. Therefore, the piston combination 9 moves axially toward the chamber 20, and the port 19 is connected openly to the chamber 15, which allows a large quantity of the oil to flow into the passage 18 through the port 19. Thus, when the vehicle is starting, the oil of the very low pressure is supplied to the clutch 27, so that the clutch engages very smoothly, and the vehicle can start smoothly without a shock.

When the speed increases, the pressure in the hydraulic governor and the chamber 20 increases, so that the piston 10 is strongly forced toward the piston 11. Therefore, the piston combination 9 moves toward the rod 23 to reduce the opening degree of the port 19 by the piston 10. And thus, the quantity of the oil discharged to the passage 18 is reduced and the pressure in the chamber 15 increases. Therefore, the oil of a high pressure is supplied to the clutch 27 and the clutch 27 engages firmly without a harmful slip in the clutch. In order to change a speed range, the selector valve 26 is once shifted to a neutral position to disengage the clutch 27 and then is shifted to engage the clutch after changing the speed range. In this operation, a time lag of the engagement of the clutch 27 is shorter than that at the starting operation, because the oil quantity of the oil discharged to the passage 18 is smaller than that in the starting operation. During high speed driving, the pressure in the chamber 20 further increases, so that the piston combination 9 further moves toward the rod 23 and the piston 10 fully closes the leak port 19. In this condition, when the clutch 27 is operated to engage after changing the speed range, the clutch 27 rapidly engages because the oil is supplied thereto without the leak. Therefore, the time lag for the engaging operation is further reduced.

Figure 2:
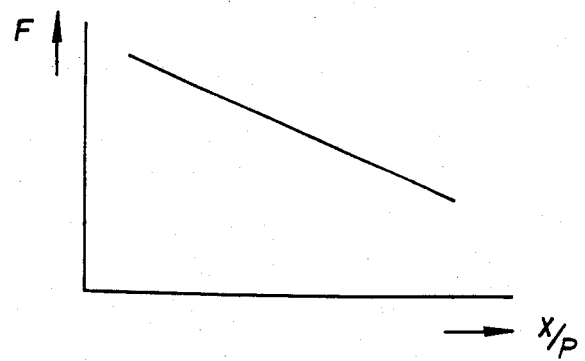
FIG. 2 is a graph showing a control characteristic of the valve in FIG. 1.

In a driving at a constant speed, the time lag for the engagement changes according to the opening degree of the throttle, as follows. When the opening degree of the throttle increases, the piston 11 is forced strongly toward the piston 10 as stated before. When the opening degree of the throttle reduces, the piston 11 is forced weakly toward the piston 10. Therefore, the time lag for the engaging operation increases according to the increasing opening degree of the throttle when the vehicle runs at the constant speed. Thus, the operation for changing the speed range can be performed dependently to the running condition, as shown in FIG. 2. In FIG. 2, the abscissa indicates a ratio of said opening degree X to the speed P, and the ordinate indicates the quantity of the oil which can be supplied to the clutch 27.

In a modification of the invention, if a mechanical governor is employed, a rod connected to the governor may be connected to the piston 10 through a spring similarly as the rod 23, the spring 25 and the piston 24. The rod 23 may be connected to a release lever of the clutch 27. The opening degree of the throttle may be changed into a hydraulic pressure, which is introduced into the chamber 22. If a torque converter is employed in the vehicle, rotation speed of a turbine of the converter may be changed into a hydraulic pressure, which is introduced to the chamber 20 to force the piston 10. The piston 10 may have same or larger diameter than the piston 11.

According to the invention, as stated before, only one valve 7 is enough for the clutch 27, which has conventionally required two valves. This simplifies the structures of the clutch system. Since the piston combination 9 is forced by opposite forces corresponding to the running speed of the vehicle and to the opening degree of the throttle, the pressure and the quantity of the oil is determined by the balance of the speed and the opening degree, which improves the operation feeling for engaging the clutch 27.

Although the invention has been described in its preferred form with a certain degree of particularity, it is understood that the present disclosure of the preferred form may be changed in the details of construction and the combination and arrangement of parts may be changed without departing from the spirit and scope of the invention as hereinafter claimed.

What is claimed is:

1. A control valve for a hydraulic clutch system comprising a cylindrical valve body; a first piston slidably fitted into the valve body; a second piston slidably fitted into the valve body; a rod connecting both pistons together; a control chamber formed between both pistons and around the rod; an inlet connecting the chamber to a supply passage connected to a hydraulic source; an outlet connecting the chamber to a supply connected to a hydraulic clutch; a leak port connecting the chamber to a drain passage; a first forcing means operable to force the first piston toward the second piston by a force according to the rotation speed of an engine; and a second forcing means operable to force the second piston toward the first piston by a force according to the opening degree of the throttle, said leak port and the first piston being relatively so positioned that an opening degree of the leak port decreases when the first piston moves toward the second piston wherein said second piston has a larger diameter than the first piston so that the difference of the pressure forces applied to both pistons by the pressurized oil in the control chamber forces the first piston to close the leak port.

2. A control valve of claim 1 wherein said first forcing means comprises a first hydraulic chamber formed in the valve body and facing an end surface of the first piston opposite to the second piston, and a oil passage connecting the first passage to a hydraulic chamber of a hydraulic governor.

3. A control valve of claim 1 wherein said second forcing means comprises a control rod connected to a mechanism for controlling the opening degree of the throttle of the engine, and a compressible spring connecting the rod and an end surface of the second piston opposite to the first piston, and the rod is designed to force the second piston toward the first piston through the compressible spring according increases in the opening degree of the throttle.

4. A control valve of claim 1 wherein said second piston has a larger diameter than the first piston so that the difference of the pressure applied to both pistons by the oil in the control chamber forces the first piston to close the leak port.

* * * * *